(12) United States Patent
Lim et al.

(10) Patent No.: US 12,050,371 B2
(45) Date of Patent: Jul. 30, 2024

(54) POLARIZATION-VARIABLE ELEMENT

(71) Applicant: LG Chem, Ltd., Seoul (KR)

(72) Inventors: Eun Jung Lim, Daejeon (KR); Dong Hyun Oh, Daejeon (KR); Jung Sun You, Daejeon (KR); Jin Hong Kim, Daejeon (KR); Hyun Jun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 254 days.

(21) Appl. No.: 17/601,817

(22) PCT Filed: Apr. 16, 2020

(86) PCT No.: PCT/KR2020/005075
§ 371 (c)(1),
(2) Date: Oct. 6, 2021

(87) PCT Pub. No.: WO2020/213943
PCT Pub. Date: Oct. 22, 2020

(65) Prior Publication Data
US 2022/0187632 A1  Jun. 16, 2022

(30) Foreign Application Priority Data

Apr. 18, 2019 (KR) .......................... 10-2019-0045486

(51) Int. Cl.
*G02F 1/01* (2006.01)
*G02F 1/137* (2006.01)

(52) U.S. Cl.
CPC .......... *G02F 1/0136* (2013.01); *G02F 1/0126* (2013.01); *G02F 1/13725* (2013.01)

(58) Field of Classification Search
CPC .. G02B 5/23; G02F 2202/14; B32B 17/10486
See application file for complete search history.

(56) References Cited

U.S. PATENT DOCUMENTS

| | | | |
|---|---|---|---|
| 6,239,778 B1 | 5/2001 | Palffy-Muhoray et al. |
| 2009/0135462 A1 | 5/2009 | Kumar et al. |
| 2013/0208201 A1 | 8/2013 | Satoh et al. |

(Continued)

FOREIGN PATENT DOCUMENTS

| | | |
|---|---|---|
| CN | 101211085 A | 7/2008 |
| CN | 101639578 A | 2/2010 |

(Continued)

OTHER PUBLICATIONS

English translation for CN-101639578-A, Zhang (Year: 2010).*

(Continued)

*Primary Examiner* — Jonathan Y Jung
(74) *Attorney, Agent, or Firm* — Lerner David LLP

(57) ABSTRACT

The present application relates to a polarization-variable element. The polarization-variable element of the present application has a fast response speed and excellent variable characteristics of polarization degree and transmittance. Such polarization-variable element may be applied to various applications including various architectural or vehicle materials requiring transmittance-variable characteristics, or eyewear such as goggles for augmented reality experience sports, sunglasses or helmets.

12 Claims, 1 Drawing Sheet

(56) References Cited

U.S. PATENT DOCUMENTS

| | | | |
|---|---|---|---|
| 2013/0250191 A1* | 9/2013 | Blum | G02C 7/102 351/158 |
| 2014/0211131 A1* | 7/2014 | Choi | G02F 1/133533 349/97 |
| 2014/0226096 A1* | 8/2014 | Taheri | G02F 1/13306 349/33 |
| 2016/0070132 A1* | 3/2016 | Soto | G02F 1/13725 349/193 |
| 2016/0085108 A1 | 3/2016 | Junge et al. | |
| 2017/0315384 A1 | 11/2017 | Saylor et al. | |
| 2018/0246327 A1* | 8/2018 | Takagi | G02B 27/0172 |
| 2019/0384094 A1 | 12/2019 | Lee et al. | |
| 2020/0057335 A1 | 2/2020 | Lee et al. | |

FOREIGN PATENT DOCUMENTS

| | | | | |
|---|---|---|---|---|
| CN | 101639578 A | * | 2/2010 | |
| CN | 103499889 A | | 1/2014 | |
| CN | 106950776 A | | 7/2017 | |
| JP | S5774724 A | | 5/1982 | |
| JP | S62121421 A | | 6/1987 | |
| JP | H0643422 A | | 2/1994 | |
| JP | 2005181642 A | | 7/2005 | |
| JP | 2018141826 A | | 9/2018 | |
| KR | 19940001060 A | | 1/1994 | |
| KR | 20110102907 A | | 9/2011 | |
| KR | 20130074622 A | | 7/2013 | |
| KR | 20150008013 A | | 1/2015 | |
| KR | 20170003266 A | | 1/2017 | |
| KR | 20170056977 A | | 5/2017 | |
| KR | 20180118311 A | | 10/2018 | |
| KR | 20180121425 A | | 11/2018 | |
| TW | 201512750 A | | 4/2015 | |
| WO | 0077559 A1 | | 12/2000 | |
| WO | WO-2017146546 A1 | * | 8/2017 | ....... G02F 1/134363 |
| WO | 2018199615 A1 | | 11/2018 | |
| WO | 2018199722 A1 | | 11/2018 | |

OTHER PUBLICATIONS

English translation for WO-2017146546-A1, Lim (Year: 2017).*
Extended European Search Report including Written Opinion for Application No. 20790689.2 dated May 16, 2022, pp. 1-9.
Taiwanese Search Report for TW Application No. 109112965 dated Sep. 30, 2021, 1 pg.
International Search Report for Application No. PCT/KR2020/005075 mailed Jul. 13, 2020, pp. 1-7.
Taiwanese Search Report for Application No. 109112965 dated Mar. 29, 2021, 1 Page.

* cited by examiner

[Figure 1]
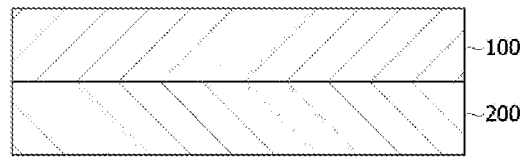
[Figure 2]
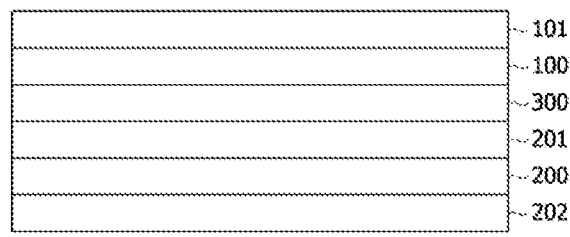
[Figure 3]
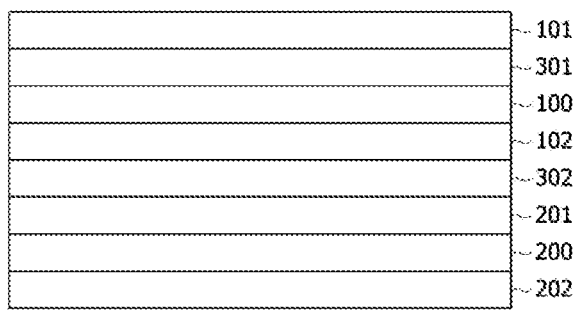
[Figure 4]
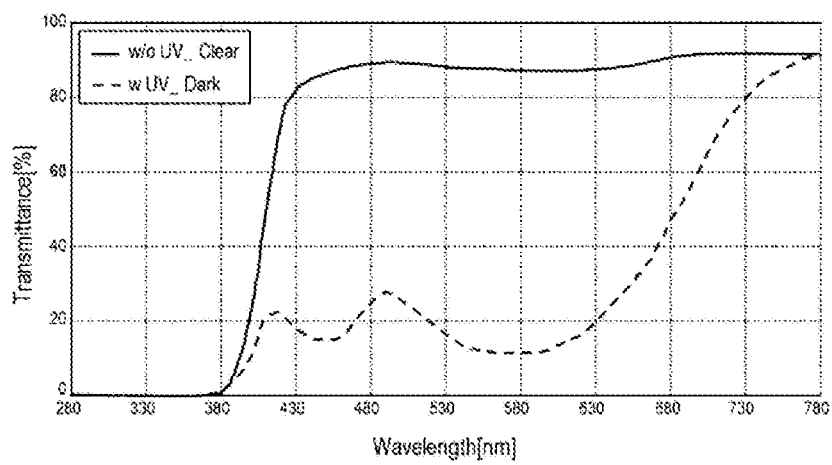

POLARIZATION-VARIABLE ELEMENT

CROSS-REFERENCE TO RELATED APPLICATION(S)

The present application is a national stage entry under 35 U.S.C. § 371 of International Application No. PCT/KR2020/005075 filed on Apr. 16, 2020, which claims priority based on Korean Patent Application No. 10-2019-0045486 filed on Apr. 18, 2019, the disclosures of which are incorporated herein by reference in their entirety.

TECHNICAL FIELD

The present application relates to a polarization-variable element.

BACKGROUND ART

A typical transmittance-variable element that is commercialized is a photochromic element. Since the photochromic element is an element having an excellent variable range, but a disadvantage that the response speed is slow, and in the case of the photochromic, colored in response to a specific UV wavelength, it is limited in market scalability due to a disadvantage that it is not variable when the user wants, because the discoloration does not occur in environments where there is no corresponding wavelength above the appropriate energy, and the matter that the user cannot adjust the desired brightness level.

In addition, currently, one of main uses of outdoor eyewear is mostly a use for reducing glare caused by reflected light. The reflected light has the characteristics of polarized light, and polarized sunglasses are used to reduce the reflected light. However, in the case of polarized sunglasses, there is a disadvantage that it is not possible to adjust the transmittance level depending on the situation (Patent Document 1: Korean Laid-Open Patent Publication No. 2015-0037790).

DISCLOSURE

Technical Problem

The present application provides a polarization-variable element having a fast response speed and excellent variable characteristics of polarization degree and transmittance.

Technical Solution

The present application relates to a polarization-variable element. In this specification, the polarization-variable element may mean an element that is capable of adjusting polarization degree depending on application of external energy, for example, depending on whether or not a voltage is applied.

The polarization-variable element may comprise a photochromic layer and a guest host liquid crystal layer. Hereinafter, the guest host liquid crystal layer may be referred to as a GHLC layer. The GHLC layer may comprise liquid crystals and an anisotropic dye. The GHLC layer may switch between a horizontal orientation state and a vertical orientation state according to application of a voltage.

The GHLC element may be electrically variable, capable of implementing intermediate gradations, and have a characteristic that a response speed is fast. By applying a photochromic element to such a GHLC element, it is possible to provide a polarization-variable element that a variable level is fast to certain transmittance and a user can adjust the variable level of transmittance. In addition, by maximizing the polarization-variable level of the applied GHLC element, it is possible to implement an element that the polarization degree and transmittance are variable.

The photochromic layer and the GHLC layer may overlap with each other and be included. Light transmitted through the photochromic layer may be incident on the GHLC layer, and conversely, light transmitted through the GHLC layer may be incident on the photochromic layer. FIG. 1 is a diagram schematically showing the state of the photochromic layer (100) and the GHLC layer (200) overlapping with each other as described above. Such a structure may be herein referred to as a hybrid polarization-variable element.

In this specification, the photochromic layer may mean a layer having characteristics that it is colored or discolored by light irradiation and returns to the original color when light is removed. For example, the photochromic layer may vary transmittance according to light irradiation. The photochromic layer may implement a state (clear state) where the average transmittance for a wavelength of 380 nm to 780 nm is relatively high in a state of being not light-irradiated, and may implement a state (dark state) where the average transmittance for a wavelength of 380 nm to 780 nm is relatively low in a state of being light-irradiated.

In one example, the photochromic layer may vary transmittance depending on irradiation of ultraviolet rays. The ultraviolet rays may be ultraviolet rays in the UVA region. The ultraviolet rays may be ultraviolet rays in a wavelength range of 200 nm to 450 nm, specifically, 300 nm to 380 nm. In order to change the transmittance of the photochromic layer, the irradiation of ultraviolet rays having an appropriate intensity may be required. The intensity of the ultraviolet rays may be, for example, in a range of 1 mJ/cm$^2$ to 200 mJ/cm$^2$, and specifically, may be 10 mJ/cm$^2$ or more, 30 mJ/cm$^2$ or more, 50 mJ/cm$^2$ or more, 70 mJ/cm$^2$ or more, 90 mJ/cm$^2$ or more, 110 mJ/cm$^2$ or more, 130 mJ/cm$^2$ or more, or 150 mJ/cm$^2$ or more, and may be 200 mJ/cm$^2$ or less.

The photochromic layer may comprise a photochromic material. When the photochromic material is exposed to light with a specific wavelength, the bonding state of the compound material changes, whereby the color of the material may be changed, while isomers having different absorption spectra or transmission spectra are generated. The photochromic phenomenon is reversible transformation of chemical species between two forms by absorption of electromagnetic radiation. The photochromic material absorbs light in a specific wavelength range to cause chemical changes, whereby the absorption or transmission spectrum is changed. The change of the absorption or transmission spectrum may vary depending on the photochromic material, but the transmittance or absorbance before and after light irradiation (light absorption) changes mainly at wavelengths within the range of 300 nm to 800 nm.

In one example, the photochromic layer may satisfy Equation 1. When the photochromic layer satisfies Equation 1, it may be advantageous to realize a polarizing element having excellent variable characteristics of polarization degree and transmittance.

$$A-B \geq 50\% \qquad \text{[Equation 1]}$$

In Equation 1, A is the transmittance (%) of the photochromic layer before ultraviolet irradiation at $\Delta T\text{max}$ wavelength, B is the transmittance (%) of the photochromic layer after ultraviolet irradiation at $\Delta T\text{max}$ wavelength, and the $\Delta T\text{max}$ wavelength means the wavelength at the point where the difference in transmittance before and after ultraviolet irradiation on the photochromic layer is largest.

Specifically, the A−B value may be 55% or more, or 60% or more, and the upper limit of the A−B value is not particularly limited, but may be, for example, 100% or less, or 99% or less.

The ΔTmax wavelength may vary depending on the photochromic material, but, for example, the ΔTmax wavelength may be in the range of 300 nm to 800 nm, 380 nm to 780 nm, 400 nm to 700 nm or 500 nm to 600 nm.

The photochromic material may comprise organic dye molecules. The photochromic material may comprise one compound or a mixture of two or more compounds selected from the group consisting of, for example, a spiropyran compound, a spiroxazine compound, a fulgide compound, a chromene compound, a naphthopyran compound, a bisimidazole compound, an azobenzene compound, a triarylmethane compound, a stilbene compound, an azastilbene compound, a nitrone compound, a quinone compound and a diarylethene compound. As the photochromic material, the compounds may be appropriately selected and used according to desired coloration or discoloration.

The polarization-variable element may further comprise a substrate disposed on one side of the photochromic layer. The substrate may be disposed on the opposite side of the photochromic layer facing the guest host liquid crystal layer. The substrate may have a thickness, for example, in a range of 0.3 T to 1.0 T. The polarization-variable element may further comprise a base layer disposed on the other side of the photochromic layer. The other side of the photochromic layer may mean the side opposite to the side of the photochromic layer on which the substrate is disposed.

In one example, the photochromic layer may be directly coated on one side of the substrate and formed. In this case, the photochromic layer may contact one side of the substrate (Structure 1). FIG. 2 exemplarily shows a polarizing element of Structure 1. The photochromic layer (100) is directly formed on one side of the substrate (101). The GHLC layer (200) is disposed between a first electrode film (201) and a second electrode film (202) to form a GHLC cell, where the photochromic layer (100) and the first electrode film (201) may be bonded via an adhesive layer (300). As described below, a first alignment film and a second alignment film may be formed on sides of the first electrode film and the second electrode film facing the GHLC layer, respectively.

In another example, the photochromic layer may be directly coated on one side of the base layer and formed, and then attached to the substrate via the adhesive. In this case, one side of the photochromic layer may contact one side of the base layer and the other side may contact one side of the adhesive (Structure 2). FIG. 3 exemplarily shows a polarizing element of Structure 2. The photochromic layer (100) is directly formed on one side of the base layer (102), where the substrate (101) and the photochromic layer (100) may be bonded via the adhesive layer (301). The GHLC layer (200) is disposed between the first electrode film (201) and the second electrode film (202) to form a GHLC cell, where the base layer (102) and the first electrode film (201) may be bonded via the adhesive layer (302). As described below, the first alignment film and the second alignment film may be formed on sides of the first electrode film and the second electrode film facing the GHLC layer, respectively.

As the base layer or substrate, a base layer or substrate comprising TAC (triacetyl cellulose); COP (cyclo olefin copolymer) such as norbornene derivatives; PMMA (poly (methyl methacrylate); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone), PEI (polyetherimide); PEN (polyethylenenaphthatlate); PET (polyethylene terephtalate); PI (polyimide); PSF (polysulfone); PAR (polyarylate) or an amorphous fluorine resin, and the like may be used, without being limited thereto.

In the polarization-variable element having Structure 2, the substrate may comprise, for example, polycarbonate, and the base layer may comprise, for example, TAC. The TAC base layer may have a function of blocking UV wavelengths. In the case of the polarizing element having Structure 2, it may be preferable in terms of securing durability, because the UV required for discoloration of the photochromic layer may reach the photochromic layer and the dichroic dye (included in the GHLC layer) vulnerable to UV is UV-blocked by the TAC base layer.

In this specification, the term "GHLC layer" may mean a functional layer that anisotropic dyes may be arranged together depending on arrangement of the liquid crystal molecules to exhibit anisotropic light absorption characteristics with respect to an orientation direction of the anisotropic dyes and the direction perpendicular to the orientation direction, respectively. For example, the anisotropic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the anisotropic dye is assumed to be a p-type dye.

The GHLC layer may function as an active polarizer. In this specification, the term "active polarizer" may mean a functional element capable of controlling anisotropic light absorption depending on application of external action. For example, the GHLC layer can control the anisotropic light absorption for the polarized light in the direction parallel to the arrangement direction of anisotropic dyes and the polarized light in the vertical direction by controlling the arrangement of the liquid crystal compound and anisotropic dyes. Since the arrangement of liquid crystals and anisotropic dyes can be controlled by the application of external action such as a magnetic field or an electric field, the GHLC layer can control anisotropic light absorption depending on the application of external action.

The type and physical properties of the liquid crystal molecules may be appropriately selected in consideration of the purpose of the present application.

In one example, the liquid crystal molecules may be nematic liquid crystals or smectic liquid crystals. The nematic liquid crystals may mean liquid crystals in which rod-like liquid crystal molecules have no regularity about positions but are arranged in parallel to the long axis direction of the liquid crystal molecules, and the smectic liquid crystals may mean liquid crystals in which rod-like liquid crystal molecules are regularly arranged to form a layered structure and are aligned in parallel with the regularity in the long axis direction. According to one example of the present application, nematic liquid crystals may be used as the liquid crystal molecules.

In one example, the liquid crystal molecules may be non-reactive liquid crystal molecules. The non-reactive liquid crystal molecules may mean liquid crystal molecules having no polymerizable group. The polymerizable group may be exemplified by an acryloyl group, an acryloyloxy group, a methacryloyl group, a methacryloyloxy group, a carboxyl group, a hydroxyl group, a vinyl group or an epoxy group, and the like, but is not limited thereto, and a known functional group known as the polymerizable group may be included.

The refractive index anisotropy of the liquid crystal molecules can be appropriately selected in consideration of target physical properties, for example, polarization degree or variable transmittance characteristics. In this specification, the term "refractive index anisotropy" may mean a difference between an extraordinary refractive index and an ordinary refractive index of liquid crystal molecules. The refractive index anisotropy of the liquid crystal molecules may be, for example, 0.01 to 0.3. The refractive index anisotropy may be 0.01 or more, 0.05 or more, or 0.07 or more, and may be 0.3 or less, 0.2 or less, 0.15 or less, or 0.13 or less. When the refractive index anisotropy of the liquid crystal molecules is within the above range, it is possible to provide a polarizing element having excellent polarization degree or variable transmittance characteristics. In one example, the lower the refractive index of the liquid crystal molecules is in the above range, the polarizing element having more excellent transmittance-variable characteristics can be provided.

The dielectric constant anisotropy of the liquid crystal molecules may have positive dielectric constant anisotropy or negative dielectric constant anisotropy in consideration of a driving method of a target liquid crystal cell. In this specification, the term "dielectric constant anisotropy" may mean a difference between an extraordinary dielectric constant ($\varepsilon_e$) and an ordinary dielectric constant ($\varepsilon_o$) of the liquid crystal molecules. The dielectric constant anisotropy of the liquid crystal molecules may be, for example, in a range within ±40, within ±30, within ±10, within ±7, within ±5 or within ±3. When the dielectric constant anisotropy of the liquid crystal molecules is controlled within the above range, it may be advantageous in terms of driving efficiency of the light modulation element.

The anisotropic dye may be included in the GHLC layer as a guest material. The anisotropic dye may serve, for example, to control the transmittance of the polarizing element depending on orientation of a host material (liquid crystal molecules). In this specification, the term "dye" may mean a material capable of intensively absorbing and/or deforming light in at least a part or all of the ranges within a visible light region, for example, within a wavelength range of 400 nm to 700 nm, and the term "anisotropic dye" may mean a material capable of anisotropic absorption of light in at least a part or all of the ranges of the visible light region.

As the anisotropic dye, for example, a known dye known to have properties that can be aligned depending on the orientation state of the liquid crystal molecules by a so-called host guest effect can be selected and used. An example of such an anisotropic dye includes a so-called azo dye, an anthraquinone dye, a methine dye, an azomethine dye, a merocyanine dye, a naphthoquinone dye, a tetrazine dye, a phenylene dye, a quaterrylene dye, a benzothiadiazole dye, a diketopyrrolopyrrole dye, a squaraine dye or a pyromethene dye, and the like, but the dye applicable in the present application is not limited thereto. As the anisotropic dye, for example, a black dye can be used. Such a dye is known, for example, as an azo dye or an anthraquinone dye, and the like, but is not limited thereto.

As the anisotropic dye, a dye having a dichroic ratio, that is, a value obtained by dividing the absorption of the polarized light parallel to the long axis direction of the anisotropic dye by the absorption of the polarized light parallel to the direction perpendicular to the long axis direction, of 5 or more, 6 or more, or 7 or more, can be used. The dye may satisfy the dichroic ratio in at least a part of the wavelengths or any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less or so.

The content of the anisotropic dye in the GHLC layer can be appropriately selected in consideration of the object of the present application. For example, the content of the anisotropic dye in the GHLC layer may be 0.1 wt % or more, 0.25 wt % or more, 0.5 wt % or more, 0.75 wt % or more, 1 wt % or more, 1.25 wt % or more, or 1.5 wt % or more. The upper limit of the content of the anisotropic dye in the GHLC layer may be, for example, 5.0 wt % or less, 4.0 wt % or less, 3.0 wt % or less, 2.75 wt % or less, 2.5 wt % or less, 2.25 wt % or less, 2.0 wt % or less, 1.75 wt % or less, or 1.5 wt % or less. When the content of the anisotropic dye in the GHLC layer satisfies the above range, it is possible to provide a polarizing element having excellent variable transmittance or polarization degree characteristics.

In the GHLC layer, the total weight of the liquid crystal molecules and the anisotropic dye may be, for example, about 60 wt % or more, 65 wt % or more, 70 wt % or more, 75 wt % or more, 80 wt % or more, 85 wt % or more, 90 wt % or more, or 95 wt % or more, and in another example, it may be less than about 100 wt %, 98 wt % or less, or 96 wt % or less.

The GHLC layer may switch the orientation states according to whether or not a voltage is applied. The GHLC layer may switch between the horizontal orientation state and the vertical orientation state according to application of a voltage. The voltage may be applied in a direction perpendicular to the GHLC layer. In one example, the GHLC layer may exist in the vertical orientation state when no voltage is applied and may exist in the horizontal orientation state when a voltage is applied. Such a liquid crystal cell may be referred to as a VA (vertical alignment) mode liquid crystal cell. In another example, the GHLC layer may exist in the horizontal orientation when no voltage is applied and may exist in the vertical orientation when a voltage is applied. Such a liquid crystal cell may be referred to as an ECB (electrically controlled birefringence) mode liquid crystal cell.

The liquid crystals and the anisotropic dye are present in a horizontally oriented state in the polarized state. The liquid crystals and the anisotropic dye are present in a vertically oriented state in the non-polarized state.

The liquid crystal molecules in the vertically oriented GHLC layer may be present in a state where the light axes are perpendicularly arranged to the plane of the liquid crystal layer. For example, the light axes of the liquid crystal molecules may form an angle in a range of about 70 to 90 degrees, 75 to 90 degrees, 80 to 90 degrees or 85 to 90 degrees, or of about 90 degrees with respect to the plane of the GHLC layer. The light axes of the plurality of liquid crystal molecules in the vertically oriented GHLC layer may be parallel to each other and may form an angle in the range of, for example, 0 to 10 degrees or 0 to 5 degrees, or of about 0 degrees.

The liquid crystal molecules in the horizontally oriented GHLC layer may be present in a state where the light axes are horizontally arranged to the plane of the liquid crystal layer. For example, the light axes of the liquid crystal molecules may form an angle in a range of about 0 to 20 degrees, 0 to 15 degrees, 0 to 10 degrees, or 0 to 5 degrees, or of about 0 degrees with respect to the plane of the GHLC layer. The light axes of the liquid crystal molecules in the horizontally oriented GHLC layer may be parallel to each other and may form, for example, an angle in the range of 0 to 10 degrees, 0 to 5 degrees, or of about 0 degrees.

The thickness of the GHLC layer may be appropriately selected in consideration of the object of the present application. The thickness of the GHLC layer may be, for example, about 0.01 μm or more, 0.1 μm or more, 1 μm or more, 2 μm or more, 3 μm or more, 4 μm or more, 5 μm or more, 6 μm or more, 7 μm or more, 8 μm or more, 9 μm or more, or 10 μm or more. The upper limit of the thickness of the GHLC layer may be, for example, about 30 μm or less, 25 μm or less, 20 μm or less, or 15 μm or less. When the thickness of the GHLC layer satisfies the above range, it is possible to provide a polarization-variable element having excellent transmittance-variable characteristics.

The polarization-variable element may comprise a first alignment film and a second alignment film on both sides of the GHLC layer. The first alignment film and/or the second alignment film may be a vertical alignment film or a horizontal alignment film.

In one example, when the GHLC cell is driven in the VA mode, the first alignment film and the second alignment film may each be a vertical alignment film. In another example, when the GHLC cell is driven in the ECB mode, the first alignment film and the second alignment film may each be a horizontal alignment film.

The polarization-variable element may adjust transmittance or polarization degree by adjusting the orientation state of the GHLC layer according to whether or not a voltage is applied. The orientation state of the GHLC layer may be adjusted by a pretilt of the alignment film.

In this specification, the pretilt may have an angle and a direction. The pretilt angle may be referred to as a polar angle, and the pre-tilt direction may also be referred to as an azimuthal angle.

The pretilt angle may mean an angle in which the light axis of the liquid crystal molecule forms with respect to a horizontal plane of the alignment film. In one example, the vertical alignment film may have a pretilt angle of about 70 degrees to 90 degrees, 75 degrees to 90 degrees, 80 degrees to 90 degrees, or 85 degrees to 90 degrees. In one example, the pretilt angle of the horizontal alignment film may be about 0 to 20 degrees, 0 to 15 degrees, 0 to 10 degrees, or 0 to 5 degrees.

The pretilt direction may mean a direction in which the light axis of the liquid crystal molecule is projected on a horizontal plane of the alignment film. The pretilt direction may be an angle formed by the projected direction and the horizontal axis (WA) of the GHLC layer. In this specification, the horizontal axis (WA) of the GHLC layer may mean a direction parallel to the long axis direction of the GHLC layer, or a direction parallel to the line connecting both eyes of an observer wearing eyewear or an observer observing a display device when a polarization-variable element is applied to the eyewear or the display device such as a TV.

The pretilt directions of the first alignment film and the second alignment film can be appropriately adjusted in consideration of the orientation of the GHLC layer. In one example, the pretilt directions of the first alignment film and the second alignment film may be parallel to each other for vertical or horizontal orientation when no voltage is applied. When the pretilt directions of the first alignment film and the second alignment film are parallel to each other, the pretilt directions of the first alignment film and the second alignment film may be anti-parallel to each other, and for example, may form 170 degrees to 190 degrees, 175 degrees to 185 degrees, preferably 180 degrees to each other.

The alignment film can be selected and used without particular limitation as long as it has orientation ability with respect to adjacent liquid crystal layers. As the alignment film, for example, a contact type alignment film such as a rubbing alignment film or a photo alignment film known to be capable of exhibiting orientation properties by a non-contact method such as irradiation of linearly polarized light by including a photo alignment film compound can be used.

It is known to adjust the pretilt direction and angle of the rubbing alignment film or the photo alignment film. In the case of the rubbing alignment film, the pretilt direction can be parallel to the rubbing direction, and the pretilt angle can be achieved by controlling the rubbing conditions, for example, the pressure condition upon rubbing, the rubbing intensity, and the like. In the case of the photo alignment film, the pretilt direction can be controlled by the direction of polarized light to be irradiated and the like, and the pretilt angle can be controlled by the angle of light irradiation, the intensity of light irradiation, and the like.

In one example, the first and second alignment films may each be a rubbing alignment film. The angle formed by the orientation axes of the first alignment film and the second alignment film may be 10 degrees or less. When the rubbing directions of the first and second alignment films are disposed to be parallel to each other, the rubbing directions of the first and second alignment films may be anti-parallel to each other, and for example, may form 170 degrees to 190 degrees, 175 degrees to 185 degrees, preferably 180 degrees to each other. The rubbing direction can be confirmed by measuring the pretilt angle, and since the liquid crystals generally lie along the rubbing direction and simultaneously generate the pretilt angle, it is possible to measure the rubbing direction by measuring the pretilt angle.

The polarization-variable element may further comprise a first electrode film and a second electrode film on both sides of the GHLC layer. When the polarization-variable element comprises the first alignment film and the second alignment film on both sides of the GHLC layer, the first electrode film and the second electrode film may be present outside the first alignment film and the second alignment film.

The first and second electrode films may each comprise a base layer and an electrode layer on the base layer.

As the base layer, a known material can be used without particular limitation. For example, a glass base material, a silicone base material or a plastic film base material can be used. The base material may be an optically isotropic base material or an optically anisotropic base material having a phase difference value. If necessary, a coating layer of gold, silver, or a silicon compound such as silicon dioxide or silicon monoxide or a coating layer such as an antireflection layer may also be present in the base layer.

As the plastic film base material, a film base material comprising TAC (triacetyl cellulose); COP (cyclo olefin copolymer) such as norbornene derivatives; PMMA (poly (methyl methacrylate); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone), PEI (polyetherimide); PEN (polyethylenenaphthatlate); PET (poly ethyleneterephtalate); PI (polyimide); PSF (polysulfone); PAR (polyarylate) or an amorphous fluorine resin, and the like may be used, without being limited thereto.

The electrode layer may apply an electric field to the GHLC layer so that the alignment state of the liquid crystal molecules in the GHLC layer may be switched. The electrode layer may be formed by depositing a conductive polymer, a conductive metal, a conductive nanowire or a metal oxide such as ITO (indium tin oxide), and the like. The electrode layer may be formed to have transparency. In this field, various materials and methods capable of forming transparent electrode layers are known, and these methods can all be applied. If necessary, the electrode layer formed on the surface of the substrate may also be appropriately patterned.

The polarization-variable element may further comprise an antireflection layer. The antireflection layer may be disposed on one side of the GHLC layer, and for example, the antireflection layer may be disposed on the opposite side of the side of the GHLC layer on which the photochromic layer is disposed. The antireflection layer may be attached to the GHLC layer via an adhesive. When the first electrode film and the second electrode film are disposed on both sides of the GHLC layer, the antireflection layer may be attached to the second electrode film via a adhesive.

As the antireflection layer, a known antireflection layer may be used in consideration of the object of the present application, and for example, an acrylate layer may be used. The antireflection layer may have a thickness of, for example, 200 nm or less, or 100 nm or less.

The polarization-variable element may have excellent polarization-variable characteristics. Since the reflected light by road surfaces or water surfaces during outdoor activities has polarization components, the polarization-variable element of the present application may be effective when blocking a polarization source during outdoor activities.

The polarization-variable element may switch between a polarized state having the polarization degree in a range of 45% to 95%, 55% to 95%, 65% to 95%, 75% to 95%, or 85% to 95% and a non-polarized state having the polarization degree of 0% to 10%. The lower limit of the polarization degree in the non-polarized state may be, for example, more than 0%, and the upper limit may be, for example, 9% or less, 8% or less, 7% or less, 6% or less, or 5% or less.

When the polarization-variable element is in the polarized state, the photochromic layer may be in a state that is irradiated with light and the GHLC layer may be in the horizontal orientation state. The transmittance of the photochromic layer in the polarized state may be 60% or less. The transmittance lower limit of the photochromic layer in the polarized state may be more than 0%, 1% or more, or 10% or more.

When the polarization-variable element is in the non-polarized state, the photochromic layer may be in a state that is not irradiated with light and the GHLC layer may be in the vertical orientation state. The transmittance of the photochromic layer in the non-polarized state may be 80% or more. The transmittance upper limit of the photochromic layer in the non-polarized state may be 100% or less, or less than 100%.

The polarization-variable element may also have excellent transmittance-variable characteristics in the polarized state and the non-polarized state. The polarization-variable element may have transmittance of 15% or less, or 10% or less in the polarized state. The polarization-variable element may have transmittance of 35% or more, 40% or more, 45% or more, 50% or more, 55% or more, or 60% or more in the non-polarized state.

The polarization-variable element may have excellent variable characteristics of polarization degree and transmittance as above through the hybrid structure of the photochromic layer and the GHLC layer.

The polarization-variable element may have haze of 10% or less, 8% or less, 6% or less, or 4% or less in each of the polarized state and the non-polarized state. Accordingly, the polarization-variable element may vary polarization degree and transmittance in a transparent state. In addition, the photochromic layer and the GHLC layer may also have haze in the above range in each of the polarized state and the non-polarized state.

The polarization-variable element may be applied to various applications including various architectural or vehicle materials requiring transmittance-variable characteristics, or eyewear such as goggles for augmented reality experience or sports, sunglasses or helmets.

Advantageous Effects

The polarization-variable element of the present application has a fast response speed and excellent variable characteristics of polarization degree and transmittance. Such a polarization-variable element may be applied to various applications including various architectural or vehicle materials requiring transmittance-variable characteristics, or eyewear such as goggles for augmented reality experience or sports, sunglasses or helmets.

DESCRIPTION OF DRAWINGS

FIG. 1 exemplarily shows a structure of a polarization-variable element in the present application.

FIG. 2 exemplarily shows a structure of a polarization-variable element in the present application.

FIG. 3 exemplarily shows a structure of a polarization-variable element in the present application.

FIG. 4 shows transmittance spectra of a photochromic layer.

MODE FOR INVENTION

Hereinafter, the present application will be described in detail through examples according to the present application and comparative examples not according to the present application, but the scope of the present application is not limited by the following examples.

MEASUREMENT EXAMPLE 1

Measurement of Transmittance and Haze

Haze and transmittance were measured according to ASTM D1003 standard using a haze meter (NDH-5000SP). Specifically, light is transmitted through the measurement object and incident into the integrating sphere, where in this process, the light is divided into diffusion light (DT, which means the sum of all diffused and emitted light) and parallel light (PT, which means exit light in the front direction excluding the diffusion light), and these lights are focused on the light receiving element in the integrating sphere, whereby the haze can be measured through the focused light. The total transmitted light (TT) by the above process is the sum (DT+PT) of the diffusion light (DT) and the parallel light (PT), where haze can be defined as a percentage (Haze (%)=100×DT/TT) of the diffusion light to the total transmitted light. In the following test examples, the total transmittance means the total transmitted light (TT).

MEASUREMENT EXAMPLE 2

Measurement of Polarization Degree

Polarization degree for a wavelength of 550 nm was measured using an ultraviolet-visible light spectrometer (V-7100, JASCO). The polarization degree (P) is a value calculated according to the following equation A.

$$\text{Polarization degree } (P) \, (\%) = \{(Tp-Tc)/(Tp+Tc)\}^{1/2} \times 100 \quad \text{[Equation A]}$$

In Equation A, Tp is the maximum transmittance of the polarizing element, and Tc is the minimum transmittance of the polarizing element. In Equation A, the maximum transmittance (Tp) is the transmittance at the time point showing the maximum value in a state where two polarizing elements are overlapped, when the transmittance has been measured while scanning the overlapped state for each angle so that the light absorption axis of each polarizing element forms an angle in the range of 0 to 360 degrees, and the minimum transmittance (Tc) is the transmittance at the time point showing the minimum value. The above-mentioned transmittance (Tc, Tp) is a value measured for light of about 550 nm.

EXAMPLE 1

Polarization-Variable Element (A)

VA mode GHLC cell (A)

A base film (product from Tejin) that an ITO (indium tin oxide) layer was formed on a PC (polycarbonate polymer) film was prepared. A vertical alignment film (SE-5661, product from Nissan) was coated on the ITO layer side of the base film by bar coating and then calcined at a temperature of 120° C. for 1 hour to obtain an alignment film having a thickness of 300 nm. The alignment film was subjected to rubbing in one direction using a rubbing cloth to prepare a first substrate.

On the ITO layer of the same film as the first substrate, column spacers having a height of 9 μm and a diameter of 15 μm were arranged at intervals of 250 μm. Next, a vertical alignment film was formed in the same manner as the first substrate, and then subjected to rubbing in one direction using a rubbing cloth to prepare a second substrate.

As a GHLC composition, a composition (MAT-16-568, Merck) comprising liquid crystals having refractive index anisotropy (Δn) of 0.13 and negative dielectric constant anisotropy, and an anisotropic dye was used.

A sealant was drawn at the edges on the alignment film surface of the second substrate with a seal dispenser. After applying the GHLC composition on the alignment film of the second substrate, the first substrate was laminated to produce a liquid crystal cell. At this time, the lamination was performed such that the rubbing direction of the alignment film of the first substrate and the rubbing direction of the alignment film of the second substrate were anti-parallel. The produced liquid crystal cell is a VA mode liquid crystal cell with a cell gap of 9 μm. An antireflection layer was attached to one side of the second substrate in the VA mode liquid crystal cell via OCA (LGC, V310).

Photochromic Layer

A product (ORDINA's spectacle lens part, product from OGK) that a photochromic material layer was coated on a PC plate having a thickness of 0.8T was prepared. FIG. 4 shows transmittance spectra of the photochromic layer. As shown in FIG. 4, the photochromic layer exhibits high transmittance in the visible light region when UV is not irradiated, and has lower transmittance in a predetermined wavelength region when UV is irradiated.

The VA mode GHLC cell (A) and the photochromic layer were attached via OCA (LGC, V310) adhesive. At this time, the photochromic layer and the first electrode film of the VA mode GHLC cell (A) were attached to contact each other.

EXAMPLE 2

Polarization-Variable Element (B)

A VA mode GHLC cell (B) was produced in the same manner as the VA mode GHLC cell (A) of Example 1, except that the cell gap was changed to 15 μm. The VA mode GHLC cell (B) and the photochromic layer used in Example 1 were attached via OCA (LGC, V310) adhesive. At this time, the photochromic layer and the first electrode film of the VA mode GHLC cell (B) were attached to contact each other.

Example 3

Polarization-Variable Element (C)

A VA mode GHLC cell (C) was produced in the same manner as the VA mode GHLC cell (A) of Example 1, except that the cell gap was changed to 15 μm, and a composition containing 1 wt % of anisotropic dye (X12, BASF) and liquid crystal (LC_ZGS8017, JNC) was used as the GHLC composition. The VA mode GHLC cell (C) and the photochromic layer used in Example 1 were attached via OCA (LGC, V310) adhesive. At this time, the photochromic layer and the first electrode film of the VA mode GHLC cell (C) were attached to contact each other.

EXAMPLE 4

Polarization-Variable Element (D)

ECB Mode GHLC Cell (D)

A base film (product from Tejin) that an ITO (indium tin oxide) layer was formed on a PC (polycarbonate polymer) film was prepared. A horizontal alignment film (SE-7492, product from Nissan) was coated on the ITO layer side of the base film by bar coating and then calcined at a temperature of 120° C. for 1 hour to obtain an alignment film having a thickness of 300 nm. The alignment film was subjected to rubbing in one direction using a rubbing cloth to prepare a first substrate.

On the ITO layer of the same film as the first substrate, column spacers having a height of 9 μm and a diameter of 15 μm were arranged at intervals of 250 μm. Next, a horizontal alignment film was formed in the same manner as the first substrate, and then subjected to rubbing in one direction using a rubbing cloth to prepare a second substrate.

As the GHLC composition, a composition containing 1 wt % of anisotropic dye (X12, BASF) and liquid crystal (HPC2180, HCCH) was used.

A sealant was drawn at the edges on the alignment film surface of the second substrate with a seal dispenser. After applying the GHLC composition on the alignment film of the second substrate, the first substrate was laminated to produce a liquid crystal cell. At this time, the lamination was performed such that the rubbing direction of the alignment film of the first substrate and the rubbing direction of the alignment film of the second substrate were anti-parallel. The produced liquid crystal cell is an ECB mode liquid crystal cell with a cell gap of 9 μm. An antireflection layer was attached to one side of the second substrate in the ECB mode liquid crystal cell via OCA (LGC, V310).

The ECB mode GHLC cell (D) and the photochromic layer used in Example 1 were attached via OCA (LGC, V310) adhesive. At this time, the photochromic layer and the first electrode film of the ECB mode GHLC cell (D) were attached to contact each other.

COMPARATIVE EXAMPLE 1

VA Mode GHLC Cell (A)

The VA mode GHLC cell (A) produced in Example 1 was prepared as Comparative Example 1.

COMPARATIVE EXAMPLE 2

VA Mode GHLC Cell (B)

The VA mode GHLC cell (B) produced in Example 2 was prepared as Comparative Example 2.

COMPARATIVE EXAMPLE 3

VA Mode GHLC Cell (C)

The VA mode GHLC cell (C) produced in Example 3 was prepared as Comparative Example 3.

COMPARATIVE EXAMPLE 4

ECB Mode GHLC Cell (D)

The ECB mode GHLC cell (D) produced in Example 4 was prepared as Comparative Example 4.

COMPARATIVE EXAMPLE 5 STN Mode GHLC Cell (E)

A base film (product from Tejin) that an ITO (indium tin oxide) layer was formed on a PC (polycarbonate polymer) film was prepared. A horizontal alignment film (SE-7492, product from Nissan) was coated on the ITO layer side of the base film by bar coating and then calcined at a temperature of 120° C. for 1 hour to obtain an alignment film having a thickness of 300 nm. The alignment film was subjected to rubbing in one direction using a rubbing cloth to prepare a first substrate.

On the ITO layer of the same film as the first substrate, column spacers having a height of 6 μm and a diameter of 15 μm were arranged at intervals of 250 μm. Next, a horizontal alignment film was formed in the same manner as the first substrate, and then subjected to rubbing in one direction using a rubbing cloth to prepare a second substrate.

As a GHLC composition, a liquid crystal composition that 0.519 wt % of a chiral dopant (S811, Merck) was added to a GHLC composition comprising liquid crystals (MDA-17-595, Merck) having refractive index anisotropy (Δn) of 0.1 and positive dielectric constant anisotropy, and an anisotropic dye (Merck) was used.

A sealant was drawn at the edges on the alignment film surface of the second substrate with a seal dispenser. After applying the GHLC composition on the alignment film of the second substrate, the first substrate was laminated to produce a liquid crystal cell. At this time, the lamination was performed such that the rubbing direction of the alignment film of the first substrate and the rubbing direction of the alignment film of the second substrate were anti-parallel. The produced liquid crystal cell is a 360 degree STN mode liquid crystal cell with a cell gap of 6 μm. An antireflection layer was attached to one side of the second substrate in the STN mode liquid crystal cell via OCA (LGC, V310).

COMPARATIVE EXAMPLE 6

Photochromic Layer

The photochromic layer used in Example 1 was prepared as Comparative Example 6.

COMPARATIVE EXAMPLE 7

Polarization-Variable Element (E)

The STN mode GHLC cell (E) of Comparative Example 5 and the photochromic layer used in Example 1 were attached via OCA (LGC, V310) adhesive. At this time, the photochromic layer and the first electrode film of the STN mode GHLC cell (E) were attached to contact each other.

EVALUATION EXAMPLE 1

Evaluation of Electro-Optical Characteristics

Electro-optical characteristics of Comparative Examples 1 to 7 and Examples 1 to 4 were evaluated and the results were described in Tables 1 to 11 below.

For the GHLC cells of Comparative Examples 1 to 5, the transmittance, haze and polarization degree depending on voltage application were measured. Specifically, while an AC power source was connected to the first and second ITO layers and driven, the transmittance, haze and polarization degree depending on whether or not a voltage was applied were measured and the results were described in Tables 1 to 5 below.

For the photochromic element of Comparative Example 6, the transmittance and haze depending on the irradiated energy of UVA (wavelengths of 300 to 380 nm) were measured and the results were described in Table 6 below.

For the polarization-variable elements of Comparative Example 7 and Examples 1 to 4, the transmittance, haze and polarization degree depending on voltage application to the GHLC cell and irradiation of UVA of 150 mJ/cm$^2$ to the photochromic layer were measured and the results were described in Tables 7 to 11 below.

The transmittance and haze were measured using a haze meter (NDH5000SP, manufactured by Secos). The transmittance and haze are the average transmittance for light having a wavelength of 380 nm to 780 nm.

In Tables 1 to 5 and 7 to 11 below, the response time is measured through a photodiode, normalized, and measured by converting the time of the transition section corresponding to the transmittance from 10% to 90%.

TABLE 1

| Comparative Example 1 VA Mode GHLC Cell (A) | Transmittance (%) | Haze (%) | Polarization Degree (%) |
|---|---|---|---|
| 0 V | 67.1% | 1.0% | <0.5% |
| 15 V | 36.8% | 1.3% | 88.2% |
| Response Time | On/Off <100 ms | | |

TABLE 2

| Comparative Example 2 VA Mode GHLC Cell (B) | Transmittance (%) | Haze (%) | Polarization Degree (%) |
|---|---|---|---|
| 0 V | 61.5% | <2% | <4% |
| 15 V | 32% | <2% | 79% |
| Response Time | On/Off <100 ms | | |

TABLE 3

| Comparative Example 3 VA Mode GHLC Cell (C) | Transmittance (%) | Haze (%) | Polarization Degree (%) |
|---|---|---|---|
| 0 V | 64.6% | <2% | <5% |
| 15 V | 37% | <2% | 76.6% |
| Response Time | On/Off <100 ms | | |

TABLE 4

| Comparative Example 4 ECB Mode GHLC Cell (D) | Transmittance (%) | Haze (%) | Polarization Degree (%) |
|---|---|---|---|
| 0 V | 61.5% | <2% | <4% |
| 15 V | 32% | <2% | 79% |
| Response Time | On/Off <100 ms | | |

TABLE 5

| Comparative Example 5 STN Mode GHLC Cell (E) | Transmittance (%) | Haze (%) | Polarization Degree (%) |
|---|---|---|---|
| 0 V | 27.0% | 1.2% | 38% |
| 15 V | 70.5 | 0.9% | <0.5% |
| Response Time | On/Off <100 ms | | |

TABLE 6

| Comparative Example 6 (Photochromic Layer) | Transmittance (%) | Haze (%) |
|---|---|---|
| UVA Irradiation Energy [mJ/cm²] | | |
| 0 | 90.2% | 0.4% |
| 32.7 | 43.3% | 0.4% |
| 89.0 | 20.1% | 0.5% |
| 150.2 | 15.4% | 0.5% |

TABLE 7

| Comparative Example 7 (STN Mode GHLC Cell (E) + Photochromic Layer) | Transmittance (%) | Haze (%) | Polarization Degree (%) |
|---|---|---|---|
| 0 V_w/o UV | 5% | 1.8% | 38% |
| 15 V_w/UV | 67.8% | 1.2% | <2% |
| Response Time | On/Off <100 ms | | |

TABLE 8

| Example 1 (VA Mode GHLC Cell (A) + Photochromic Layer) | Transmittance (%) | Haze (%) | Polarization Degree (%) |
|---|---|---|---|
| 0 V_w/o UV | 62% | <2% | <0.5% |
| 15 V_w/UV | 6.5% | <2% | 88.2% |
| Response Time | On/Off <100 ms | | |

TABLE 9

| Example 2 (VA Mode GHLC Cell (B) + Photochromic Layer) | Transmittance (%) | Haze (%) | Polarization Degree (%) |
|---|---|---|---|
| 0 V_w/o UV | 55% | <2% | <4% |
| 15 V_w/UV | 5% | <2% | 79% |
| Response Time | On/Off <100 ms | | |

TABLE 10

| Example 3 (VA Mode GHLC Cell (C) + Photochromic Layer) | Transmittance (%) | Haze (%) | Polarization Degree (%) |
|---|---|---|---|
| 0 V_w/o UV | 58% | <2% | <5% |
| 15 V_w/UV | 6% | <2% | 76.6% |
| Response Time | On/Off <100 ms | | |

TABLE 11

| Example 4 (ECB Mode GHLC Cell (D) + Photochromic Layer) | Transmittance (%) | Haze (%) | Polarization Degree (%) |
|---|---|---|---|
| 0 V_w/o UV | 6% | <2% | 80.4% |
| 15 V_w/UV | 62% | <2% | <2% |
| Response Time | On/Off <100 ms | | |

EXPLANATION OF REFERENCE NUMERALS

101: substrate
100: photochromic layer
102: base layer
300, 301, 302: adhesive layer
200: GHLC layer
201: first electrode film
202: second electrode film

The invention claimed is:

1. A polarization-variable element comprising a photochromic layer and a guest host liquid crystal cell,
wherein the guest host liquid crystal cell comprises a guest host liquid crystal layer, a first electrode film and a second electrode film on first and second respective sides of the guest host liquid crystal layer, and a first alignment film and a second alignment film formed on sides of the first electrode film and the second electrode film facing the guest host liquid crystal layer, respectively,
wherein the guest host liquid crystal layer comprises liquid crystals and an anisotropic dye, the guest host liquid crystal layer is switchable between a horizontal orientation state and a vertical orientation state depending on a voltage application, and light axes of liquid crystal molecules in the horizontal orientation state are parallel to each other, wherein the polarization-variable element further comprises a substrate disposed on a first side of the photochromic layer opposite a second side of the photochromic layer that faces the guest host liquid crystal layer, and the photochromic layer and the first electrode film are bonded via an adhesive layer, wherein the photochromic layer satisfies Equation 1:

$$A-B \geq 50\% \quad \text{[Equation 1]}$$

wherein A is a transmittance (%) of the photochromic layer before ultraviolet irradiation at ΔTmax wavelength, B is a transmittance (%) of the photochromic layer after ultraviolet irradiation at ΔTmax wavelength, and the ΔTmax wavelength means a wavelength having a largest difference in transmittance of the photochromic layer before and after ultraviolet irradiation, and wherein the ΔTmax wavelength is in a range of 500 nm to 600 nm.

2. The polarization-variable element according to claim 1, wherein the photochromic layer comprises a photochromic material that is transmittance-variable depending on ultraviolet irradiation.

3. The polarization-variable element according to claim 1, wherein the polarization-variable element is switchable between a polarized state having a polarization degree in a range of 45% to 95% and a non-polarized state having a polarization degree of 0% to 10%.

4. The polarization-variable element according to claim 3, wherein the polarization-variable element has a transmittance of 15% or less in the polarized state and a transmittance of 35% or more in the non-polarized state.

5. The polarization-variable element according to claim 3, wherein the polarization-variable element has haze of 10% or less in each of the polarized state and the non-polarized state.

6. The polarization-variable element according to claim 3, wherein the photochromic layer has a transmittance of 60% or less in the polarized state.

7. The polarization-variable element according to claim 3, wherein the photochromic layer has a transmittance of 80% or more in the non-polarized state.

8. The polarization-variable element according to claim 3, wherein the liquid crystals and the anisotropic dye are present in a horizontally oriented state in the polarized state.

9. The polarization-variable element according to claim 3, wherein the liquid crystals and the anisotropic dye are present in a vertically oriented state in the non-polarized state.

10. The polarization-variable element according to claim 1, wherein a first alignment film and a second alignment film are included on both sides of the guest host liquid crystal layer, and an angle formed between orientation axes of the first alignment film and the second alignment film is 10 degrees or less.

11. The polarization-variable element according to claim 1, further comprising a base layer disposed on the other side of the photochromic layer.

12. The polarization-variable element according to claim 1, further comprising an antireflection layer on one side of the guest host liquid crystal layer.

* * * * *